United States Patent

[11] 3,616,219

| [72] | Inventor | Henry C. Massey<br>Decatur, Ill. |
|---|---|---|
| [21] | Appl. No. | 17,912 |
| [22] | Filed | Mar. 9, 1970 |
| [23] | | Division of Ser. No. 777,140, Nov. 19, 1968, abandoned. |
| [45] | Patented | Oct. 26, 1971 |
| [73] | Assignee | A.E. Staley Manufacturing Company<br>Decatur, Ill. |

[54] PROCESS FOR IMPROVED ENZYME CONVERTIBILITY OF STARCH
6 Claims, No Drawings

[52] U.S. Cl. .................................................. 195/31
[51] Int. Cl. .................................................. C12d 13/00
[50] Field of Search ....................................... 195/31; 99/141, 142; 260/233.3; 127/32, 33, 40

[56] References Cited
UNITED STATES PATENTS

| 2,720,465 | 10/1955 | Fetzer et al. ................ | 195/31 |
| 2,806,026 | 9/1957 | Evans ......................... | 260/233.3 |

FOREIGN PATENTS

| 723,142 | 12/1965 | Canada ........................ | 195/31 |

Primary Examiner—A. Louis Monacell
Assistant Examiner—Gary M. Nath
Attorney—Charles J. Meyerson ABSTRACT: Process for hydrolyzing starch with alpha-amylase in which aqueous starch hydrolyzable by alpha-amylase, a water-insoluble calcium compound as an alpha-amylase thermostabilizing agent, and an alkali metal orthophosphate buffering agent are combined with an alpha-amylase preparation for a time sufficient to allow hydrolysis of the starch to occur.

PROCESS FOR IMPROVED ENZYME CONVERTIBILITY OF STARCH

This is a division of application Ser. No. 777,140 filed Nov. 19, 1968 now abandoned.

DISCLOSURE OF THE INVENTION

The present invention relates to improvements in enzyme converting starch. More particularly, it relates to starch compositions which have been especially formulated to display improved alpha-amylase convertibility. The invention also relates to an improved method for hydrolyzing starch with alpha-amylase.

The treatment of aqueous starch pastes with alpha-amylase, if carried out properly, is known to the prior art to be capable of providing conversion products of valuable properties. The prior art, for example, long has been aware that such treatments can be employed to prepare hydrolyzates having properties rendering them useful as adhesives and coatings in the manufacture of paper and textile products. The use of starch alpha-amylase conversion products in such areas has suffered, however, from several drawbacks. One disadvantage resides in the extra cost of the enzyme which is required. Another stems from the fact that alpha-amylase starch conversions have been found to be relatively difficult to control. Aggravating the latter problem is the fact that, in a great many operations, for various operating and/or economic reasons, the starch alpha-amylase conversion product must be produced at the site of actual usage with an attendant sacrifice to process efficiency in terms of available skilled personnel and optimum equipment design. Starch producers have attempted to reduce the problems of those operating using onsite conversion by tailor-making products of given convertibility properties. A common approach, for example, has been to offer a line of enzyme convertible starches of varying pH properties. This undesirably has burdened the starch producers with additional products and control problems. And, in the final analysis, it still has not eliminated unexpected variances in the convertibility of various starches. Consequently, although hydrolyzates produced by alpha-amylase conversions often are superior in terms of performance to competing materials, the use of alpha-amylase as a means of converting starch to useful hydrolyzates has not achieved its full potential.

Accordingly, it is the primary object of the present invention to provide starch materials having improved alpha-amylase conversion properties.

Another object of the present invention is to provide starch compositions advantageously convertible by alpha-amylase with a minimum of process control.

Still another object of the present invention is to provide starch compositions which advantageously are adapted to be purchased by manufacturers of paper, textiles, and the like products, and suitably converted at the site of actual usage in conventional equipment by operators of ordinary skill.

The particular object of the present invention is to provide an alpha-amylase convertible starch in a form which can be utilized by practically all commercial users of alpha-amylase starch hydrolyzates with a minimum of worry and effort to produce hydrolyzates of substantial uniform properties.

Broadly described, the present invention constitutes a starch composition of improved enzyme convertibility which comprises a mixture of (1) a major proportion of a starch material hydrolyzable in an aqueous medium by alpha-amylase; (2) an alkali metal orthophosphate buffering agent, said orthophosphate buffering agent being present in an amount such that 8 percent by weight aqueous pastes of said composition maintained, when alpha-amylase converted at 175° F., a pH in the range of from about 6.0 to about 7.5; and (3) an effective amount of an alpha-amylase thermostabilizing agent in the form of a calcium compound which is substantially insoluble in water at 77° F.

By means of the present invention several important advantages result. Primary is that the heretofore troublesome and unexplicable tendency of apparently equivalent starch materials to alpha-amylase convert differently is essentially obviated. Stabilized as by the present invention, starch compositions of given specifications advantageously now can be substantially uniformly converted. As a result, problems of reaction control which heretofore plagued alpha-amylase conversions are greatly simplified. The uniform convertibility characteristics of the starch also eliminate the need for starch producers to offer a series of starches and they need now only to provide one stabilized product. For these reasons, the requirements in terms of operator skill and equipment heretofore necessary to carry out particular hydrolysis are significantly reduced. Another consequence is that the amount of off-specification material produced in alpha-amylase conversions is greatly reduced or eliminated resulting in the total cost of using alpha-amylase conversions being diminished. Advantageously, therefore, the present invention offers a means by which manufacturers of paper, textiles, and the like products who wish to employ alpha-amylase starch conversion products easily and simply may do so.

The present invention is based on the discovery that variations in the enzyme convertibility of apparently similar starches, e.g., those having identical cold water slurry pHs, often are due to the starches themselves undergoing shifts from alkaline to more acidic materials during enzyme conversion. This phenomenon, for example, has been found to be pronounced in starches which have been bleached as part of their preparation. With such starches, therefore, addition of mineral acids or acid salts such as hydrochloric acid, sulfuric acid, or sodium carbonate to adjust the cold water slurry pH of the starch to values optimum for conventional alpha-amylases, namely in the range of from about 6.0 to about 7.5 has not been effective since, upon ultimate formation and hydrolysis of the past from the adjusted starch, the pH unsuitably shifts to more acidic values. Consequently, although not purposely, enzyme conversion of such starches heretofore has been effected, in fact, at pH values not only other than optimum for the particular alpha-amylase utilized, but sometimes even acid enough to undesirably cause enzyme inactivation. In any event, thinning is less than desired and erratic.

Conventional stabilization, exemplified by the technique disclosed in U.S. Pat. No. 3,378,462 involving an addition of water-soluble calcium compounds, while desirable and effective against undesirable temperature effects, did not solve the problem. Additional attempts to use the available buffers with such calcium compounds similarly were unsuccessful due to the buffer being incompatible with the calcium compound and/or an inability of the calcium-buffer buffer combination to suitably operate at optimum pHs, namely those in the range of from about 6.0 to about 7.5. The problems previously encountered surprisingly and unexpectedly were eliminated, however by substituting a water-insoluble calcium compound in place of the conventional water-soluble thermostabilizers and combining it with an alkali metal orthophosphate buffering agent, the latter being a buffer previously found to be incompatible with the conventional water-soluble calcium stabilizers.

The starch component of the enzyme convertible compositions of the present invention suitably may be any starch material capable of being hydrolyzed by alpha-amylase. Included among suitable starch forms are any alpha-amylase hydrolyzable granular or nongranular form of (1) unmodified starches such as those derived from corn, wheat, rice, potatoes, tapioca, and the like vegetable sources, (2) modified starches derived therefrom by treatment with oxidizing agents as calcium or sodium hydrochlorite or mineral acids such as sulfuric or hydrochloric acid, or (3) derivatized starches such as acetylated starch and hydroxypropyl starch derived from such unmodified or modified starches by reaction with appropriate conventional esterifying or etherifying agents. A preferred class of starch material for use are those of the described types which also have been bleached by controlled treatment with conventional oxidizing agents such as sodium or calcium hypochlorite, sodium or potassium permanganate, and the like. Due to their relatively low cost and availability, bleached starches derived from unmodified corn starch constitute the more preferred materials for use.

The calcium component of the compositions of the instant invention suitably may be any inorganic or organic calcium compound, or mixture of such compounds, which is substantially insoluble at normal room temperature (77° F.). Suitable compounds in general will have solubility in water at 77° F. of less than 0.005 gram per 100 ml. Specific examples of suitable forms of calcium include calcium carbonate, tricalcium phosphate, calcium oxalate, calcium laurate, calcium tartrate, and the like. Due to its relatively low cost and advantageous solubility and enzyme stabilizing properties, the preferred insoluble calcium compound is calcium carbonate.

The alkali metal orthophosphate component of the instant composition suitably may be in the form of a monoalkali metal salt, a dialkali metal salt, or a mixture of mono- and dialkali metal salts. Specific examples of suitable salts include monosodium and monopotassium orthophosphate, disodium and dipotassium orthophosphate, and mixtures thereof. By virtue of its range of capabilities, a preferred buffering agent is a mixture of such mono- and dialkali salts having a weight ratio of monoalkali salt to dialkali salt in the range of from about 0.2:1 to about 5:1.

In preparing the formulations of the invention the starch, calcium compound, and phosphate buffer ingredients may be combined in any sequence using any convenient mixing means. Starch materials, for example, normally are recovered from aqueous slurries in which they are given one type of treatment or another. The calcium component, being insoluble, suitably may be added to such slurries and thereafter separated and dried along with the starch. More usually, the three essential ingredients of the formulation are dry mixed in rotary mixers, blenders, and the like.

The proportion of ingredients combined in actual embodiments of the compositions of the present invention may vary depending upon the particular starch, calcium compound, and orthophosphate buffering agent utilized and the properties desired of the particular stabilized mixture. The starch ingredient, of course, is present in major amounts in relation to the proportions of the calcium compound and orthophosphate buffer.

In the instant compositions, as in prior art compositions, the calcium compound is added in amounts effective to improve the thermostability of alpha-amylases. The more desirable calcium compound concentrations are those which provide maximum enzyme stabilization at the particular conditions obtaining when the given composition is alpha-amylase converted. Increasing calcium concentrations, for example, are desired with enzymes of lower thermostability, with lower enzyme concentrations, and with increasing conversion temperatures and hold times. Under typical conversion conditions, at least about 0.006 percent and more preferably at least about 0.05 percent calcium compound based in the dry weight of the starch component of the composition, is sufficient to provide the desired stabilization. Excess calcium compound does not interfere with the process and in some cases is even desirable to ease control problems. No real benefit in terms of thinning efficiency is gained by excess calcium compound concentration, however, and consequently the calcium compound levels actually utilized seldom exceed about 1.0 percent of the dry weight of the starch component.

In particular embodiments of the instant compositions, the amount of orthophosphate buffering agent added is that necessary to provide the described pH control when the composition ultimately is enzyme converted. The orthophosphate buffering agent must be capable of providing the above-described buffering of pastes formed from the compositions against the effects of constituents present in the compositions themselves as well as those subsequently added to the compositions for the conversion treatment. Since only enzymes need be added generally to the compositions prior to conversion, the effect of the former constituents, in the main, can be disregarded. The primary buffering then is against the effects of constituents already present such as nonstarch compounds and residues present in the starch component due to conventional recovery and/or special treatments previously carried out on it and/or starch-bound moieties which are freed or converted during the enzyme conversion to a form which ordinarily would effect a pH shift. Corn starch recovered by conventional wet-milling processes, for example, normally has a cold water slurry pH in the range of from about 5.0 to about 7.0 due to the presence of residual acidic salts which during washing can be removed to provide an essentially unreacted starch material. Hypochlorite-bleached products derived from such corn starch, on the other hand, are distinctly alkaline in cold water pH response after washing. Such bleached starches, however, undergo a shift toward more acidic pHs when enzyme converted. These features, coupled with the presence of acidic compounds added to adjust the normal cold water slurry pH properties of these starches to conventional levels of 5.0 to 7.0 necessitates that increased amounts of buffer component be present to offset the inordinate pH shift. In general, orthophosphate buffer agent concentrations of at least about 0.05 percent, and more preferably at least about 0.2 percent based on the dry weight of the starch component are sufficient to provide the desired pH stabilization. The more preferred levels, particularly in the case of compositions containing starch components have molecularly based ionic moieties, usually are in the range of from about 0.2 to about 1 percent, of the starch component dry weight. Higher levels of buffering agent suitably can be employed but, since they only add to cost without additional benefit, usually are avoided.

In use, the stabilized compositions 12 of the present invention can suitably be used in the manner conventional to prior art alpha-amylase convertible starches. That is, using any conventional technique and available equipment, they are pasted by heating them in water and the resultant pastes are hydrolyzed with alpha-amylase to the desired viscosity levels. As stated, due to the properties of the compositions of the present invention, the only additional components required to be added in order to proceed with the conversion are water and alpha-amylase. The compositions, for example, typically are dispersed in water at starch concentrations of from about 5 to about 40 percent of the starch component, dry substance weight basis, and then hydrolyzed at a temperature in the range of from about 160° F. to about 195° F. with an alpha-amylase preparation desired from a microbial source, e.g., bacteria such as Bacillus subtilis or fungi such as Aspergillus niger.

The invention having been described in detail, the following examples are provided to show specific embodiments of the composition and process thereof. It will be understood the examples are given for illustration purposes only and not by way of limitation.

EXAMPLE I

A mixture was formed by dry blending the following ingredients in the indicated proportions:

| | Parts, dry substance weight |
|---|---|
| Bleached (sodium hypochlorite-treated) Unmodified Corn Starch | 100 |
| Monosodium orthophosphate | 0.3 |
| Disodium orthophosphate | 0.1 |
| Calcium carbonate | 0.1 |

About 32 g. of the mixture was slurried with stirring in about 368 ml. of cold distilled water. The resultant slurry had a pH of about 6.8. About 0.5 cc. of a 1 percent aqueous solution of a commercial alpha-amylase preparation (Vanzyme 31, Vanderbilt Chemical Co.) then was added. The resultant mixture was then heated and stirred on a Weber-Ehrenfeldt water bath at about 175° F. for 20 minutes to effect hydrolysis of the starch. The enzyme in the resultant liquid was then inactivated by heating the liquid on a steam bath for 15 minutes.

After water was added in an amount necessary to compensate for losses during the heating periods, the liquid was cooled to about 150° F. The pH of the cooled liquid was about 6.5, and its viscosity, run on a Brookfield Viscometer Model RVT using No. 1 spindle at 100 r.p.m., was about 21.5 c.p.s.

A first control experiment run on another sample of the bleached corn starch, as described, except for eliminating the orthophosphate salts and calcium carbonate, revealed that the converted liquid pH was about 5.9 as compared to a starting starch slurry pH of about 6.8. The drop in pH resulted in a poorly converted paste having viscosity, measured as above, of 92.5 c.p.s.

In a second control experiment, another sample of the bleached corn starch was washed with distilled water (repeatedly suspended and filtered) until no further pH change of the suspension was noted. This yielded a cold water slurry pH of about 8.0. The washed starch was then enzyme converted as described above. Tests conducted as before revealed that during the conversion the pH of the mass dropped to about 5.7, resulting in an even more poorly converted liquid having a viscosity of about 815 c.p.s.

EXAMPLE II

A sample of an unmodified corn starch (unbleached) was repeatedly rinsed with distilled water as in example I to a constant pH of about 5.4. After drying, an aliquot of the washed starch was employed to prepare a formulation of the following composition:

| | Parts, dry substance weight |
|---|---|
| Unmodified corn starch | 100 |
| Monosodium orthophosphate | 0.2 |
| Disodium orthophosphate | 0.2 |
| Calcium carbonate | 0.1 |

The raw cool water slurry pH of the formulation was about 7.0.

Using the procedure of example I, a sample of the composition was converted with alpha-amylase, and the pH and viscosity of the resultant hydrolyzate paste were measured. The tests revealed the aqueous hydrolyzate had a pH of about 6.6 and a Brookfield viscosity of about 30 c.p.s.

By way of comparison, conversion of a sample of the washed starch alone yielded a poorly converted paste having a pH of about 5.75 and a Brookfield viscosity of about 345 c.p.s. while the same washed starch adjusted to a raw pH of about 7.0 with sodium hydroxide yields a conversion hydrolyzate having a pH of about 6.5 and a viscosity of about 45 c.p.s.

The results of the above examples clearly demonstrate that the compositions of the present invention convert more uniformly than prior art starches and thus offer a route for obtaining significantly improved alpha-amylase converted hydrolyzates.

Further embodiments of this invention which do not depart from the spirit and scope thereof, of course, will be apparent to those skilled in the art. Accordingly, the foregoing is to be interpreted as illustrative only and the invention will be understood to be limited only by the scope of the appended claims.

What is claimed is:

1. A process for hydrolyzing starch which comprises (A) combining water, a starch composition and an alpha-amylase preparation so that the concentration of said starch composition in water is in the range of from about 5 percent to about 40 percent by weight, dry substance basis, said starch composition comprising (1) a major proportion of starch hydrolyzable in an aqueous medium by alpha-amylase, (2) an alkali metal orthophosphate buffering agent in an amount such that a pH range of from 6.0 to 7.5 is maintained in a paste of about 8 percent by weight of said starch composition and about 92 percent by weight of water when said paste is alpha-amylase converted at 175° F., and (3) a calcium compound, substantially insoluble in water at 77° F., in an amount which thermostabilizes said alpha-amylase preparation to a predetermined extent; and (B) maintaining said starch under hydrolysis conditions for a time to cause the starch to be hydrolyzed by the action of said alpha-amylase preparation.

2. The process of claim 1 wherein said calcium compound is calcium carbonate.

3. The process of claim 1 wherein said alkali metal orthophosphate buffering agent is a mixture of monoalkali metal orthophosphate and a dialkali metal orthophosphate.

4. The process of claim 3 wherein said starch material is a bleached starch.

5. The process of claim 4 wherein the concentration of said alkali metal orthophosphate buffering agent is in the range of from about 0.05 percent to about 1 percent by weight of said starch material, dry substance basis, and the weight ratio of said monoalkali metal orthophosphate to said dialkali metal orthophosphate is in the range of from about 0.2:1 to about 5:1.

6. The process of claim 5 wherein said water-insoluble calcium compound is calcium carbonate.

* * * * *

UNITED STATES PATENT OFFICE
CERTIFICATE OF CORRECTION

Patent No. 3,616,219            Dated October 26, 1971

Inventor(s) Henry C. Massey

It is certified that error appears in the above-identified patent and that said Letters Patent are hereby corrected as shown below:

Column 2, line 34, for "past" read ---paste---.
Column 3, line 54, for "0.006%" read ---0.005%---.
Column 3, line 56, for "in" read ---on---.
Column 4, line 24, for "0.2" read ---0.1---.
Column 4, line 32, for "12" read ---of---.

Signed and sealed this 25th day of April 1972.

(SEAL)
Attest:

EDWARD M. FLETCHER, JR.            ROBERT GOTTSCHALK
Attesting Officer                     Commissioner of Patents